(12) United States Patent
Carey et al.

(10) Patent No.: US 10,591,379 B2
(45) Date of Patent: Mar. 17, 2020

(54) SYSTEM AND METHOD FOR IDENTIFYING A SOURCE OF HIGH PRESSURE LEAKAGE

(71) Applicant: Cummins Inc., Columbus, IN (US)

(72) Inventors: David Michael Carey, Greenwood, IN (US); Shounak Mishra, Kokomo, IN (US); Zachary L. Anslinger, Columbus, IN (US); Sarah E. Gnau, Lexington, KY (US); Srinivas K. Mulukutla, Pune (IN); Edward Nathan Linen, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/477,445

(22) PCT Filed: Dec. 27, 2017

(86) PCT No.: PCT/US2017/068463
§ 371 (c)(1),
(2) Date: Jul. 11, 2019

(87) PCT Pub. No.: WO2019/132867
PCT Pub. Date: Jul. 4, 2019

(65) Prior Publication Data
US 2019/0360888 A1    Nov. 28, 2019

(51) Int. Cl.
*F02D 41/30* (2006.01)
*G01M 3/26* (2006.01)
*F02D 41/38* (2006.01)
*F02D 41/22* (2006.01)
*F02D 1/08* (2006.01)

(52) U.S. Cl.
CPC .............. *G01M 3/26* (2013.01); *F02D 41/38* (2013.01); *F02D 41/3863* (2013.01); *F02D 2001/082* (2013.01); *F02D 2041/225* (2013.01); *F02D 2200/0602* (2013.01)

(58) Field of Classification Search
USPC ..................................... 73/114.43
See application file for complete search history.

(56) References Cited

U.S. PATENT DOCUMENTS 5,715,786 A   2/1998   Seiberth
5,883,301 A   3/1999   Filippi et al.
(Continued)

FOREIGN PATENT DOCUMENTS

DE    10245389 A1    4/2004
DE    10337546 A1    2/2005
(Continued)

OTHER PUBLICATIONS

International Search Report issued by the ISA/US, Commissioner for Patents, dated Mar. 12, 2018 for International Application No. PCT/US2017/068463; 2 pages.
(Continued)

*Primary Examiner* — Andre J Allen
(74) *Attorney, Agent, or Firm* — Faegre Drinker Biddle & Reath LLP

(57) ABSTRACT

A method for identifying a source of high pressure leakage of a fuel system of an engine comprising determining pressure decay values at a first pressure and at a second pressure and identifying the source of high pressure leakage based on the pressure decay values at each pressure.

21 Claims, 6 Drawing Sheets

(56) References Cited

U.S. PATENT DOCUMENTS

| | | |
|---|---|---|
| 7,337,652 B2 | 3/2008 | Shamine |
| 7,762,234 B2 | 7/2010 | Ulrey et al. |
| 8,191,533 B2 | 6/2012 | Ulrey et al. |
| 8,857,412 B2 | 10/2014 | Nistler et al. |
| 8,997,715 B2 | 4/2015 | Worthington et al. |
| 9,476,378 B2 | 10/2016 | Lee |
| 2002/0112528 A1 | 8/2002 | Antonioli et al. |
| 2006/0179922 A1 | 8/2006 | Sacca |
| 2008/0041331 A1* | 2/2008 | Puckett ............ F02D 41/22 123/198 D |
| 2008/0163677 A1 | 7/2008 | Mayer |
| 2009/0049898 A1 | 2/2009 | Elkolaly |
| 2011/0139130 A1* | 6/2011 | Siddiqui ......... F02M 25/0818 123/520 |
| 2012/0291457 A1* | 11/2012 | Brown ............. F25B 45/00 62/77 |
| 2014/0257721 A1* | 9/2014 | Thompson ......... G01M 3/226 702/51 |
| 2015/0020777 A1* | 1/2015 | Carey .............. F02D 41/22 123/445 |
| 2015/0068288 A1 | 3/2015 | Gaudet et al. |
| 2015/0167572 A1 | 6/2015 | Lee |
| 2016/0245221 A1 | 8/2016 | McEwan et al. |

FOREIGN PATENT DOCUMENTS

| | | |
|---|---|---|
| DE | 102007052451 A1 | 5/2009 |
| EP | 1036923 A2 | 9/2000 |
| FR | 2741113 A1 | 5/1997 |
| JP | H10221198 A | 8/1998 |
| JP | 2004293311 A | 10/2004 |
| JP | 2011252502 A | 12/2011 |
| JP | 2013119833 S | 6/2013 |
| JP | 2013177851 A | 9/2013 |
| KR | 101130388 B1 | 3/2012 |
| KR | 101518946 B1 | 5/2015 |
| WO | 2002086437 A1 | 10/2002 |
| WO | 2009061912 A2 | 5/2009 |
| WO | 2010029791 A1 | 3/2010 |
| WO | 2017019856 A1 | 2/2017 |

OTHER PUBLICATIONS

Written Opinion of the International Search Authority issued by the ISA/US, Commissioner for Patents, dated Mar. 12, 2018 for International Application No. PCT/US2017/068463; 5 pages.

* cited by examiner

SYSTEM AND METHOD FOR IDENTIFYING A SOURCE OF HIGH PRESSURE LEAKAGE

CROSS-REFERENCE TO RELATED APPLICATION

The present application is a U.S. national stage filing of PCT/US2017/068463, filed on Dec. 27, 2017, entitled "SYSTEM AND METHOD FOR IDENTIFYING A SOURCE OF HIGH PRESSURE LEAKAGE," the entire disclosure of which being hereby expressly incorporated herein by reference.

TECHNICAL FIELD OF THE DISCLOSURE

The present disclosure relates to a system and method for identifying a source of high pressure leakage, more specifically, identifying a source of high pressure leakage using pressure decay values obtained shortly after engine shutdown.

BACKGROUND OF THE DISCLOSURE

The high pressure circuit of a fuel system is often designed to be leak-less, trapping fuel pressure in the absence of engine operation. However, occasional defects, vibration levels exceeding design limits, and high pressure operation resulting in cavitation induced failures could lead to leaks, and the design of the system may pose unique challenges for detecting and identifying the source of such leakage. It is desired to have a system and method for identifying a source of high pressure leakage that allows for quick, reliable detection and identification of a leak or leaks to avoid further damage to the fuel system.

SUMMARY OF THE DISCLOSURE

In one embodiment of the present disclosure, a method for identifying a source of high pressure leakage is provided. The method comprises providing a control system comprising a control computer having non-transitory instructions thereon, and at least one sensor for determining pressure within a fuel system of an engine, shutting the engine down, causing pressure within the fuel system to reach a first initial pressure, receiving, by the control computer, data from the at least one sensor representing pressure within the fuel system over a first period of time, causing pressure within the fuel system to reach a second initial pressure, receiving, by the control computer, data from the at least one sensor representing pressure within the fuel system over a second period of time, the first and second periods of time occurring while the engine is shut down, determining, by the control computer, a pressure decay value over the first period of time and a pressure decay value over the second period of time, and determining, by the control computer, if one of at least one outlet check valve of the fuel system and at least one sub-component of the fuel system are a source of high pressure leakage in the engine, wherein the at least one outlet check valve is determined to be a source of high pressure leakage when the pressure decay value over the first period of time is below a first pressure decay predetermined threshold value and the pressure decay value over the second period of time exceeds a second pressure decay predetermined threshold value, and the at least one sub-component of the fuel system is determined to be a source of high pressure leakage when the pressure decay values during both the first and second periods of time exceed both the first pressure decay predetermined threshold value and the second pressure decay predetermined threshold value.

In one aspect of the method, the method further comprises transmitting an indication identifying the one of the at least one outlet check valve of the fuel system and the at least one sub-component of the fuel system as the source of high pressure leakage in the engine.

In another aspect of the method, the method further comprises one of repairing or replacing the one of the outlet check valve and the sub-component of the engine identified as the source of high pressure leakage.

In a further aspect of the method, the first and second periods of time are both within approximately 70 minutes of the engine being shut down.

In another aspect of the method, the first and second periods of time are both within approximately 10 minutes of the engine being shut down.

In another aspect of the method, the first and second periods of time both occur during a first engine shut down.

In another aspect of the method, the second period of time begins after the first period of time ends.

In another aspect of the method, the second period of time begins and ends before the first period of time begins.

In another aspect of the method, one of the first period of time and the second period of time occurs during a first engine shut down and the other of the first period of time and the second period of time occurs during a second engine shut down.

In another aspect of the method, both the first pressure decay predetermined threshold value and the second pressure decay predetermined threshold value are between approximately 0.04 bar/second and approximately 0.3 bar/second.

In another aspect of the method, the sub-component of the engine includes one of at least one fuel injector and at least one inter-connected joint.

In another aspect of the method, the at least one sub-component of the engine includes at least a first sub-component and a second sub-component, and when the at least one sub-component is identified as the source of high pressure leakage, the method further includes isolating one of the first sub-component and the second sub-component to form an isolated fuel system and determining if the isolated sub-component is the source of high pressure leakage by receiving, by the control computer, data from the at least one sensor representing the pressure within the isolated fuel system over a third period of time during the engine shut down at an isolation initial pressure, determining, by the control computer, a pressure decay value over the third period of time, and comparing the pressure decay value during the third period of time to a third pressure decay predetermined threshold value, wherein if the pressure decay value is below the third pressure decay predetermined threshold value, then repeating the isolating and determining for the other of the first sub-component and the second sub-component, and if the pressure decay value exceeds the third pressure decay predetermined threshold value, then indicating that the isolated one of the first sub-component and the second sub-component is the source of high pressure leakage.

In a further aspect of the method, the isolation initial pressure is one of the first initial pressure and the second initial pressure, and the third pressure decay predetermined threshold value is one of the first pressure decay predetermined threshold value and the second pressure decay predetermined threshold value.

In another aspect of the method, the first initial pressure is between approximately 1400 and approximately 2500 bar and the second initial pressure is between approximately 500 and approximately 1000 bar.

In another embodiment of the present disclosure, a system for identifying a source of high pressure leakage of a fuel system of an engine is provided. The system comprises a pressure sensor operable to detect pressure in the fuel system starting at a first initial pressure for a first period of time and starting a second initial pressure for a second period of time, the first initial pressure and the second initial pressure and the first and second periods of time occurring while the engine is shut down, and a control module having non-transitory instructions thereon and configured to determine if one of at least one outlet check valve of the fuel system and at least one sub-component of the fuel system is a source of high pressure leakage, wherein the at least one outlet check value is determined to be a source of high pressure leakage if a pressure decay value determined during the first period of time is below a first pressure decay predetermined threshold value and a pressure decay value determined during the second period of time exceeds a second pressure decay predetermined threshold value, and the sub-component of the fuel system is determined to be a source of high pressure leakage if the pressure decay values during both the first period of time and the second period of time exceed both the first pressure decay predetermined threshold value and the second pressure decay predetermined threshold value.

In one aspect of the system, the control module is further configured to transmit an alert to a user of the system indicating the one of the at least one outlet check valve and the at least one sub-component determined to be the source of the high pressure leakage.

In another aspect of the system, the first and second periods of time are both within approximately 10 minutes of the engine being shut down.

In another aspect of the system, the first and second periods of time both occur during a first engine shut down.

In another aspect of the system, the at least on sub-component of the fuel system includes at least a first sub-component and a second sub-component and when the control module identifies the at least one sub-component as the source of high pressure leakage, the pressure sensor is further operable to detect pressure of an isolated fuel system and the control module is further configured to determine which of the first sub-component and the second sub-component is the source of high pressure leakage by isolating at least one of the first sub-component and the second sub-component to form the isolated fuel system.

In another embodiment of the present disclosure, another method for identifying a source of high pressure leakage is provided. The method comprises providing a control system comprising a control computer having non-transitory instructions thereon, and at least one sensor for determining pressure within a fuel system of an engine, shutting the engine down, causing pressure within the fuel system to reach a first initial pressure, receiving, by the control computer, data from the at least one sensor representing pressure within the fuel system over a first period of time, causing pressure within the fuel system to reach a second initial pressure, receiving, by the control computer, data from the at least one sensor representing pressure within the fuel system over a second period of time, the first and second periods of time occurring while the engine is shut down, determining, by the control computer, a pressure decay value over the first period of time and a pressure decay value over the second period of time, determining, by the control computer, a pressure decay ratio of the pressure decay value over the second period of time to the pressure decay value over the first period of time, and determining, by the control computer, if one of at least one outlet check valve of the fuel system and at least one sub-component of the fuel system are a source of high pressure leakage in the engine, where the at least one outlet check valve is determined to be a source of high pressure leakage when the pressure decay ratio is approximately 1.5 or higher, and the at least one sub-component of the fuel system is determined to be a source of high pressure leakage when the pressure decay ratio is approximately 0.75 or lower.

In one aspect of the method, the method further comprises transmitting an indication identifying the one of the at least one outlet check valve of the fuel system and the at least one sub-component of the fuel system as the source of high pressure leakage in the engine.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

Figure 1:
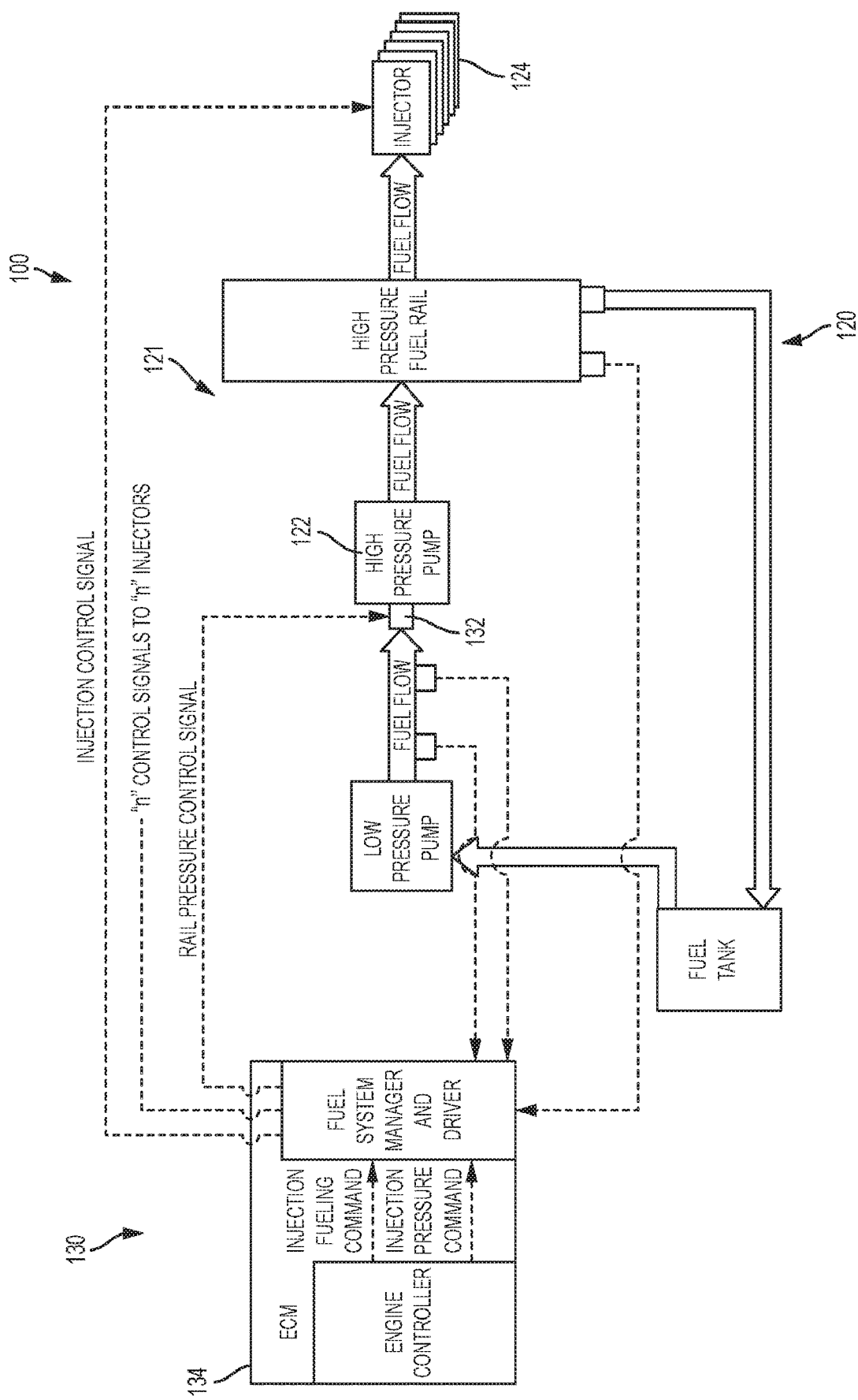
FIG. 1 is a diagram of an embodiment of a system of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

A system of the present disclosure generally includes an engine, a fuel system, and a control system. The engine of the system generally includes any number of cylinders, such as one, two, four, six, twelve, sixteen, twenty, etc., arranged in a variety of configurations, including inline, straight, and "V," and may be any type of engine, including compression ignition and spark ignition. In various embodiments, the engine may be a high horse power engine; while in other embodiments, the engine may be a typical automotive engine.

With reference to FIG. 1, a system 100 of the present disclosure generally includes an engine (not shown), a fuel system 120, and a control system 130. Fuel system 120 includes a leak-less high pressure circuit 121 having at least one outlet check valve in a high pressure fuel pump 122 and at least one sub-component for providing fuel to the cylinder (s) of the engine. In various embodiments, the engine includes a plurality of cylinders, and fuel system 120 includes an outlet check valve in high pressure pump 122 and a plurality of sub-components. The sub-components of fuel system 120 may include one or more fuel injectors 124 and/or one or more inter-connected joints (not shown). In an exemplary embodiment, the engine includes six cylinders (not shown) and fuel system 120 includes six fuel injectors 124 with a plurality of inter-connected joints (not shown) there between. In various embodiments, fuel system 120 is a modular common rail fuel system having injectors 124 and inter-connected joints daisy-chained together.

Control system 130 generally includes a pressure sensor 132 and a control module or computer 134 having non-transitory instructions, where pressure sensor 132 is generally configured to detect pressure in fuel system 120. The control module or computer 134 may include a controller or engine control module ("ECM"). The controller or ECM may be a processor having a memory, a transmitter, and a receiver. For example, actions of the control system may be performed by elements of a computer system or other hardware capable of executing programmed instructions, for example, a general purpose computer, special purpose computer, a workstation, or other programmable data processing apparatus. These various control actions also may be performed by specialized circuits (e.g., discrete logic gates interconnected to perform a specialized function), by program instructions (software), such as logical blocks, program modules, or other similar applications which may be executed by one or more processors (e.g., one or more microprocessors, a central processing unit (CPU), and/or an application specific integrated circuit), or any combination thereof. For example, embodiments may be implemented in hardware, software, firmware, middleware, microcode, or any combination thereof. Instructions may be in the form of program code or code segments that perform necessary tasks and can be stored in a non-transitory, machine-readable medium such as a storage medium or other storage(s). A code segment may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. In this way, control system 130 is configured with a leakage algorithm to determine a pressure decay value over at least two separate periods of time each starting at a separate initial pressure and to identify a source of high pressure leakage such that the various components of fuel system 120 may be repaired or replaced to prevent further damage to system 100 and/or fuel system 120.

In general, leaks in system 100 occur at one of two places: at the source of pressurized fuel flow inlet (i.e., the outlet check valve(s) of high pressure pump 122) or between or at sub-components of fuel system 120 (i.e., fuel injectors 124 or inter-connections there between). Leaks typically originate at sub-components of fuel system 120 due to loose or improper joint connections, or leaky or damaged pilot valves within fuel injectors 124, while leaks typically originate at the outlet check valves of high pressure pump 122 due to a phenomenon known as cavitation induced damage. Cavitation induced damage is caused when fuel inside the pumping plungers of high pressure pump 122 is rapidly pressurized, and minute quantities of dissolved air present in the fuel heats up and expands. This expansion results in formation of air bubbles that rise to the surface and collapse at liquid-metal interface. Over a period of time, these collapsing air bubbles slowly start to eat away the metal surface leading to fractures. The cavitation at the periphery of the outlet check valves may cause seepage of pressurized fuel back into the pumping plunger leading to a loss of pressure in the fuel rail.

Figure 2:
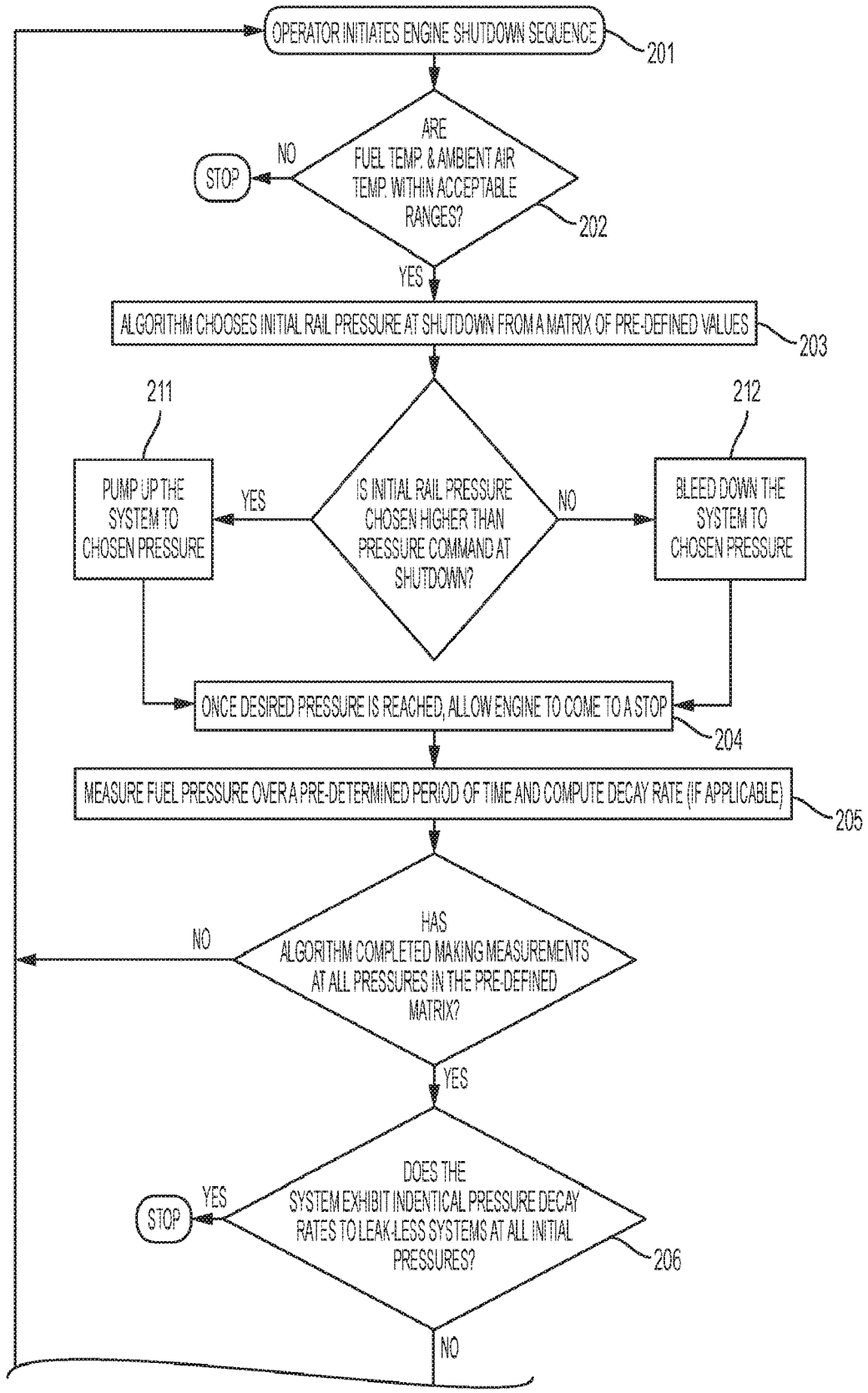
FIG. 2 is a flow chart of a method for identifying a source of high pressure leakage according to an embodiment of the present disclosure.
Figure 2:
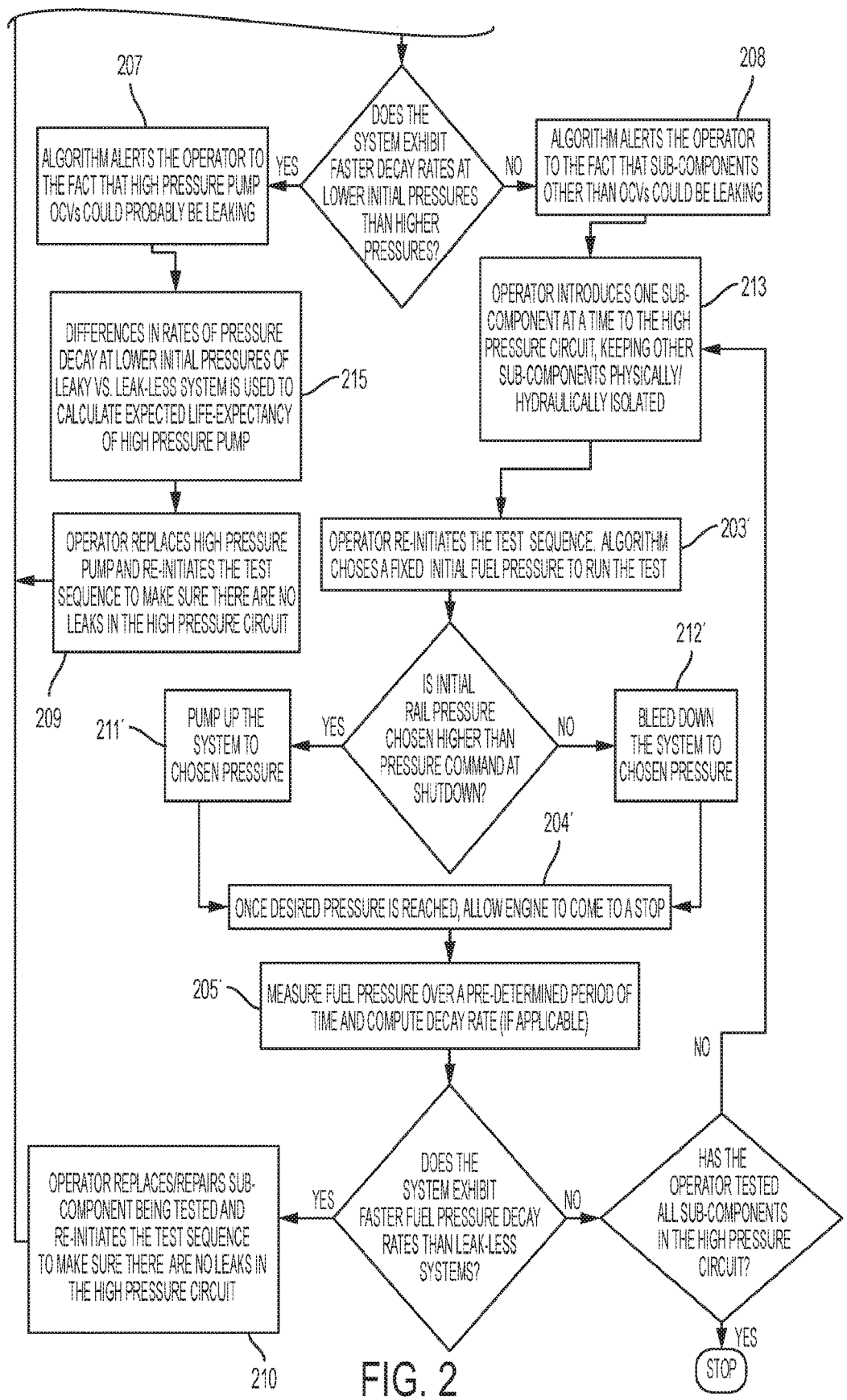

With reference to FIG. 2, in operation, after the engine shutdown sequence is initiated (step 201), control module 134 of control system 130 is configured to select a first initial pressure from a pre-defined matrix of pressures (step 203, 203'). In various embodiments, control module 134 of control system 130 may monitor fuel and ambient air temperatures using various sensors to determine whether the fuel and ambient temperatures are within acceptable ranges for measuring pressure decay (step 202) within fuel system 120 prior to selecting the first initial pressure. Once the selected first initial pressure is achieved, control module 134 is configured to transmit instructions for the engine and fuel system 120 to come to a complete stop (step 204, 204'). Once the engine and fuel system 120 are at a complete stop, control module 134 is configured to begin receiving measurements of pressure of the rail system of fuel system 120 from pressure sensor 132 for a first pre-determined period of time (step 205, 205'). After the first pre-determined period of time has lapsed, control module 134 of control system 130 is configured to determine the pressure decay over the first pre-determined period of time. Control module 134 of control system 130 is also configured to repeat the pressure measurements and pressure decay determination at at least a second pre-defined pressure for a second pre-determined period of time. In various embodiments, pressure measurements for the second pre-determined period of time may be obtained prior to determining the pressure decay value for either period of time. Upon determining each of the pressure decay values, control module 134 is then configured to determine if a leak has developed by comparing the pressure decay values to first and second pre-determined pressure decay thresholds which correspond to a leak-less system (step 206). If any of the measured pressure decay values exceed the respective thresholds, then control module 134 of control system 130 is configured to indicate to a user of system 100 that a leakage is present and where the leakage is occurring (step 207 or 208) (as is further described below) such that the user may repair or replace the component identified as the source of the leakage to avoid further damage to system 100 and/or fuel system 120 (step 209 or 210).

In various embodiments, the first and second initial pressures are chosen from between approximately 500 bar and approximately 2500 bar such that at least one of the first and second initial pressures is a low pressure (i.e., between approximately 500 bar and 1000 bar) and the other of the first and second initial pressures is a high pressure (i.e., between approximately 1200 bar and 2500 bar). If the chosen initial pressure is higher than the pressure of the fuel rail at shut down, the system increases the pressure by any of a combination of methods (step 211, 211'), for example, opening the fuel inlet valve to allow the high pressure pump to pressurize more fuel, restricting the amount of fuel leaving the rail through the injectors, and/or closing an electronic pressure relief valve until the desired rail pressure has been achieved. If the chosen initial pressure is lower than the pressure of the fuel rail at shut down, the system decreases the pressure by any of a combination of methods (step 212, 212'), for example, restricting the fuel inlet valve to limit the amount of fuel being pressurized, allowing more fueling by the injectors, and/or opening an electronic pressure relief valve until the desired rail pressure has been achieved. In various embodiments, the first and second periods of time may each occur during separate engine shutdowns, while in other various embodiments, the first and second periods of time may each occur during the same engine shutdown. In an exemplary embodiment, the first initial pressure is a high pressure and the second initial pressure is a low pressure such that both the first and second periods of time may occur during a single engine shutdown period. In general, the first and second periods of time occur within approximately 70 minutes of the engine shutdown, or more preferably within approximately 10 minutes or less of the engine shutdown.

When no leaks are present in system 100, the leak-less high pressure circuit 121 will retain or trap fuel pressure for an indefinite period of time even in the absence of engine operation. Because of this retention, when fuel system 120 has little to no leakage, the system 100 will show little to no change in pressure or pressure decay over the period of time after the engine is shut down. However, if system 120 develops a leak, a drop in fuel pressure or an increase in pressure decay can be recorded after the engine is shutdown, and the source of the leak can be determined based on the drop in fuel pressure or pressure decay of system 100.

Figure 3:
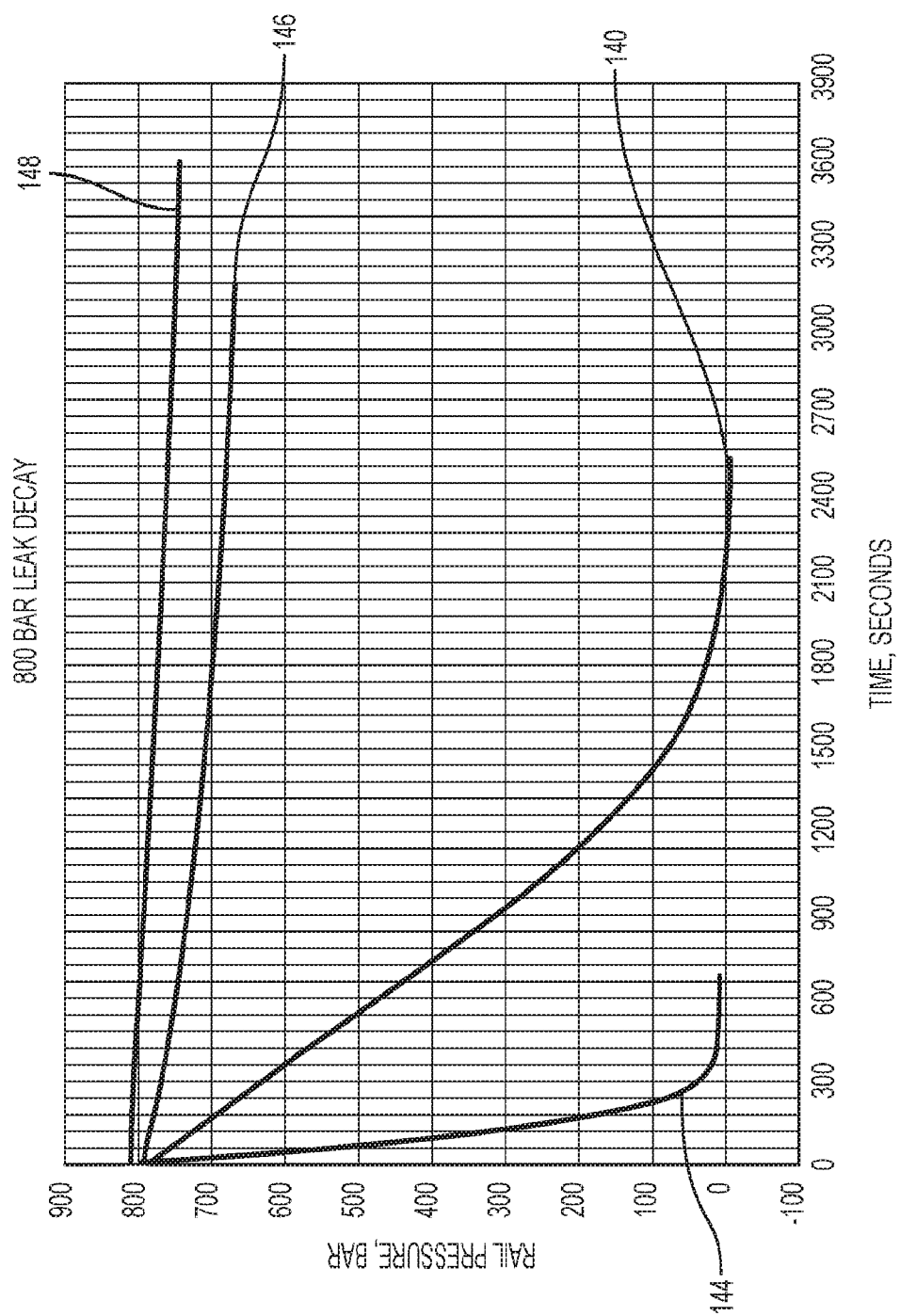
FIG. 3 is a graphical representation of rail pressure of various systems of the present disclosure over a period of time with an initial pressure of 800 bar.
Figure 4:
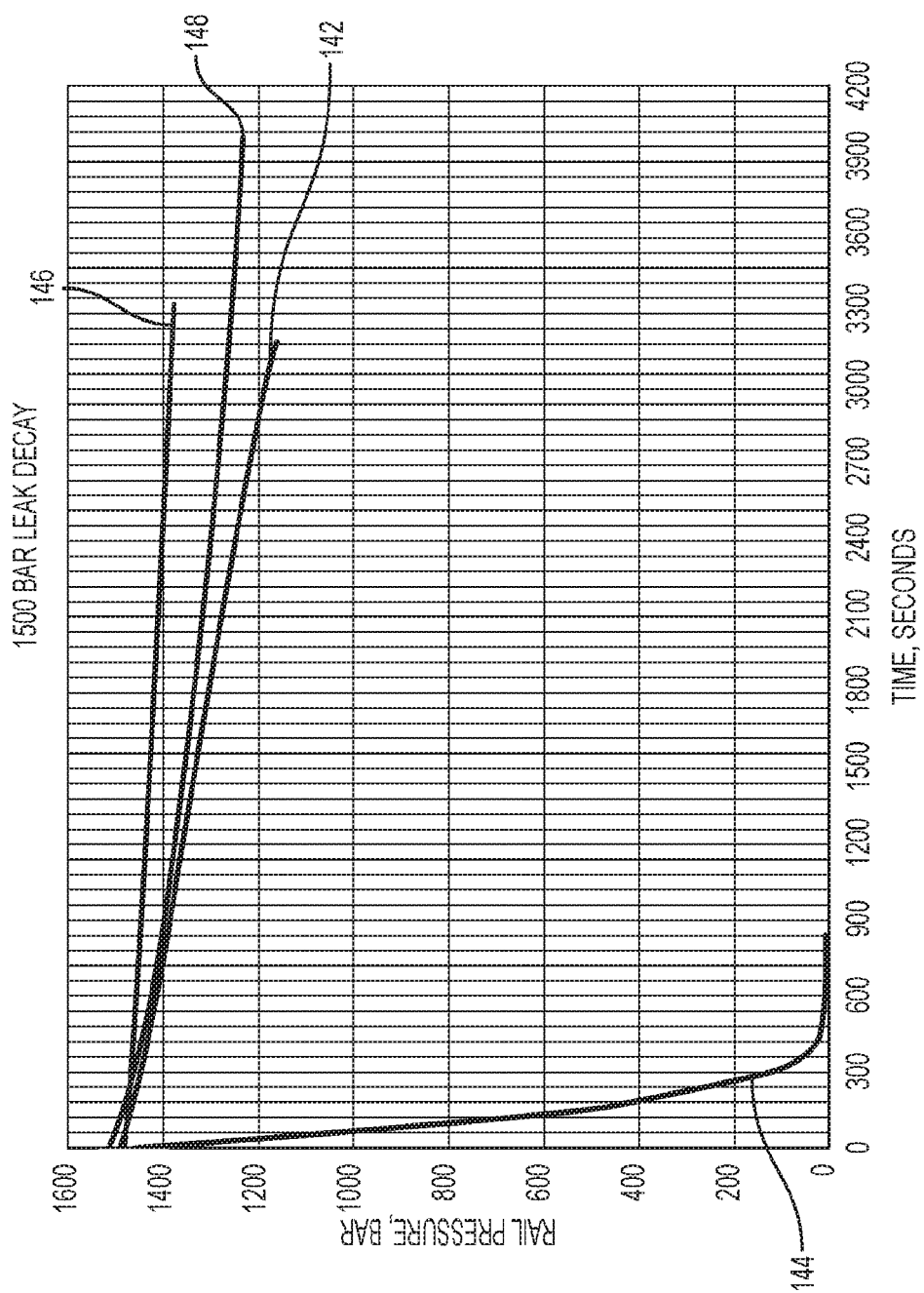
FIG. 4 is a graphical representation of rail pressure of various systems of the present disclosure over a period of time with an initial pressure of 1500 bar.
Figure 5:
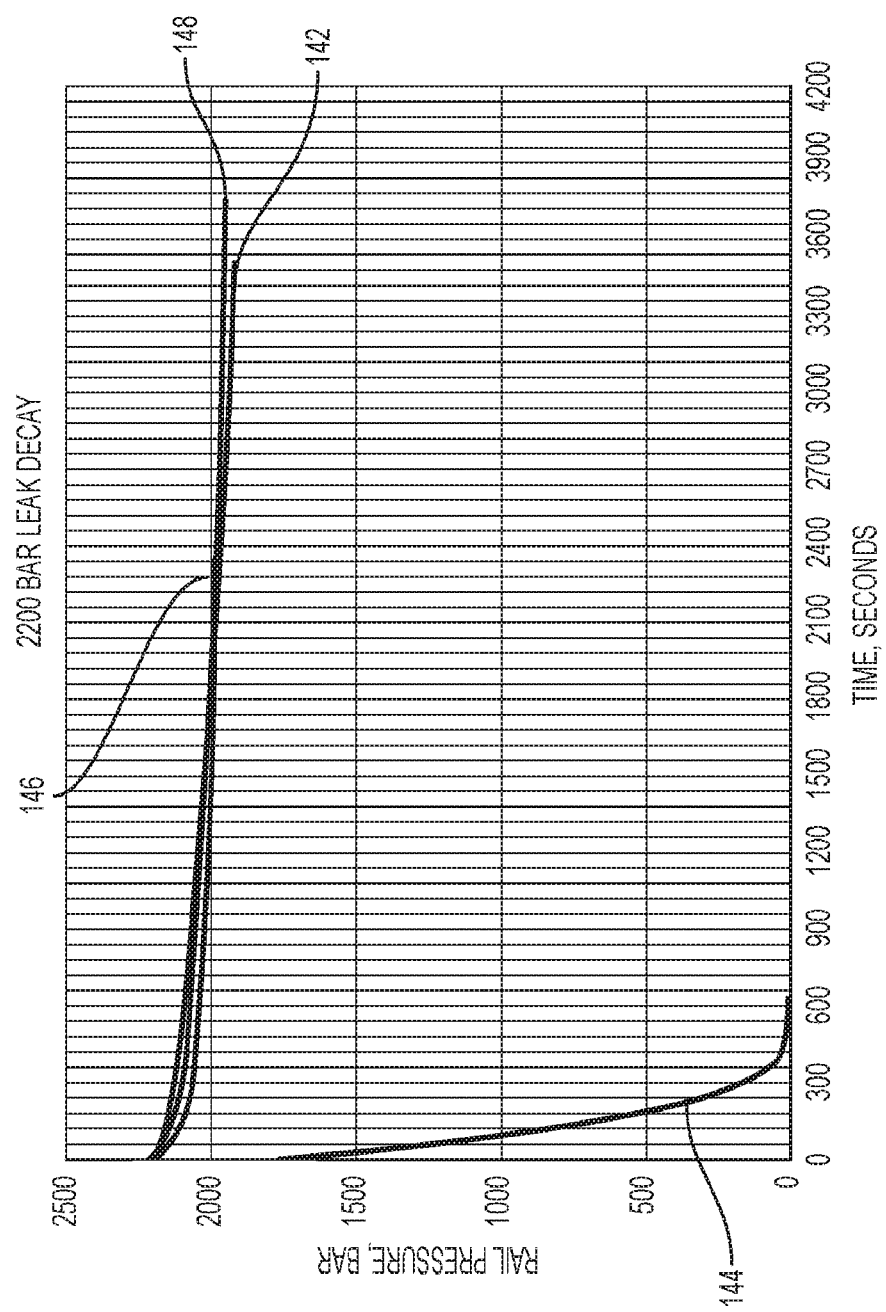
FIG. 5 is a graphical representation of rail pressure of various systems of the present disclosure over a period of time with an initial pressure of 2200 bar.

Referring to FIGS. 3-5, a leak at the source of a pressurized fuel inlet, for example, the outlet check valves of high pressure pump 122, results in a high pressure decay rate 140 when the initial pressure at engine shut down is low, for example, less than approximately 1000 bar, and a low pressure decay rate 142 when the initial pressure at engine shut down is high, for example, greater than 1200 bar. A high pressure decay or leakage detection at the outlet check valves will not result when the initial pressure is high due to a back-pressure acting on the outlet check valves, keeping them sealed. However, a leak originating through sub-components 124 of fuel system 120 other than the outlet check valves, such as the fuel injectors 124, for example, shows a high pressure decay 144, 144', 144" at all initial pressures, including, for example, pressures as low as approximately 500 bar or as high as approximately 2500 bar. Systems that do not have leaks have relatively low pressure decays 146 and 148 at any and all initial pressures. Thus, if the system indicates a high pressure decay at a low initial pressure but a low pressure decay at a high initial pressure, then the outlet check valves of high pressure pump 122 can be identified as the source of the leak (step 207). However, if the system indicates a high pressure decay at both low and high initial pressures, then the at least one sub-component of fuel system 120 can be identified as the source of the leak (step 208). In various embodiments, when the outlet check valves are determined to be the source of the leak, the pressure decay rate at the lower initial pressure may be compared to an expected value (i.e., a pressure decay rate of a leak-less system) such that an expected life-expectancy may be calculated for high pressure pump 122 (step 215).

In various embodiments, systems with a low pressure decay value may include systems with high horse power engines where changes in pressure or pressure decays do not exceed pre-determined threshold values that may be as little as 0.0 bar/second, 0.05 bar/second, or 0.1 bar/second or as high as approximately 0.15 bar/sec, 0.2 bar/sec, or 0.3 bar/second, or within any range there between such as 0.0 to 0.3 bar/second or 0.05 to 0.3 bar/second, for example. In addition, systems with a normal automotive engine where changes in pressure or pressure decay do not exceed pre-determined threshold values that may be as little as 0 bar/second, 5 bar/second, or 10 bar/second, as high as 40 bar/second, 45 bar/second or 50 bar/second, or within any range between any of the foregoing values such as 0 to 50 bar/second, or 5 to 50 bar/second, for example, may also be considered systems with a low pressure decay value. Systems with high or undesirable pressure decay on the other hand include systems that exceed the pre-determined threshold values. In an exemplary embodiment, the first and second pre-determined threshold values are each individually between 0.04 bar/second and 0.3 bar/second for high horse power engines, and 2.5 bar/second and 50 bar/second for normal automotive engines.

Still referring to FIGS. 3-5, a leak in the system also results in a ratio of the pressure decay rate of the system at a low pressure to the pressure decay rate of the system at a high pressure being outside a band around 1, where the upper limit of the band is approximately 1.5 and the lower limit of the band is approximately 0.75. Accordingly, in certain embodiments systems having a leak will exhibit a ratio of pressure decay rates being approximately 1.5 or higher or approximately 0.75 or lower. For instance, a leak at the source of a pressurized fuel inlet, for example, the outlet check valves of high pressure pump 122, exhibits a ratio of the pressure decay rate 140 when the initial pressure at engine shut down is low to the pressure decay rate 142 when the initial pressure at engine shut down is high of approximately 1.5 or higher, for example 2. On the other hand, a leak originating through sub-components 124 of fuel system 120 other than the outlet check valves, such as the fuel injectors 124, for example, exhibits a ratio of the pressure decay rate 144 when the initial pressure at engine shut down is low to the pressure decay rate 144' when the initial pressure at engine shut down is high of approximately 0.75 or lower, for example 0.5.

If the control system 130 identifies the outlet check valves as the source of the leak, system 100 may alert or transmit an indication to a user of system 100 indicating the outlet check value(s) as the source of the leak such that the user may then repair or replace fuel pump 122 and/or the outlet check valve(s) to fix the leak (step 207). Once fuel pump 122 and/or outlet check valve(s) are repaired or replaced, the testing of system 100 may be repeated to ensure the leak has been fixed.

If the control system 130 identifies at least one sub-component of fuel system 120 as the source of the leak, each sub-component of fuel system 120 may be isolated from the other sub-components of the high pressure circuit to repeat pressure decay determinations for each individual sub-component to determine which sub-component(s) is the source of the leak (step 213). If the pressure decay during the period of time of isolation is greater than a given threshold value, then the isolated sub-component is determined to be the source of the leak. In various embodiments, the given threshold value for isolation may be the same as the first and/or the second pre-determined pressure decay threshold. Once the defective or damaged sub-component(s) of system 100 are identified (step 214), an alert or indication may be transmitted to a user of system 100 identifying the source of the leak such that the defective or damaged sub-component may be repaired or replaced. Once sub-component(s) is repaired or replaced, the testing of system 100 may be repeated to ensure the leak has been fixed.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for identifying a source of high pressure leakage, comprising:
    providing a control system comprising a control computer having non-transitory instructions thereon, and at least one sensor for determining pressure within a fuel system of an engine;
    shutting the engine down;
    causing pressure within the fuel system to reach a first initial pressure;
    receiving, by the control computer, data from the at least one sensor representing pressure within the fuel system over a first period of time;
    causing pressure within the fuel system to reach a second initial pressure;
    receiving, by the control computer, data from the at least one sensor representing pressure within the fuel system over a second period of time, the first and second periods of time occurring while the engine is shut down;
    determining, by the control computer, a pressure decay value over the first period of time and a pressure decay value over the second period of time; and
    determining, by the control computer, if one of at least one outlet check valve of the fuel system and at least one sub-component of the fuel system are a source of high pressure leakage in the engine, wherein
        a) the at least one outlet check valve is determined to be a source of high pressure leakage when the pressure decay value over the first period of time is below a first pressure decay predetermined threshold value and the pressure decay value over the second period of time exceeds a second pressure decay predetermined threshold value; and
        b) the at least one sub-component of the fuel system is determined to be a source of high pressure leakage when the pressure decay values during both the first and second periods of time exceed both the first pressure decay predetermined threshold value and the second pressure decay predetermined threshold value.

2. The method of claim 1 further comprising transmitting an indication identifying the one of the at least one outlet check valve of the fuel system and the at least one sub-component of the fuel system as the source of high pressure leakage in the engine.

3. The method of claim 1 further comprising one of repairing and replacing the one of the outlet check valve and the sub-component of the fuel system identified as the source of high pressure leakage.

4. The method of claim 1, wherein the first and second periods of time are both within approximately 70 minutes of the engine being shut down.

5. The method of claim 4, wherein the first and second periods of time are both within approximately 10 minutes of the engine being shut down.

6. The method of claim 1, wherein the first and second periods of time both occur during a first engine shut down.

7. The method of claim 1, wherein the second period of time begins after the first period of time ends.

8. The method of claim 1, wherein the second period of time begins and ends before the first period of time begins.

9. The method of claim 1, wherein one of the first period of time and the second period of time occurs during a first engine shut down and the other of the first period of time and the second period of time occurs during a second engine shut down.

10. The method of claim 1, wherein both the first pressure decay predetermined threshold value and the second pressure decay predetermined threshold value are between approximately 0.04 bar/second and approximately 0.3 bar/second.

11. The method of claim 1, wherein the at least one sub-component of the fuel system includes one of at least one fuel injector and at least one inter-connected joint.

12. The method of claim 1, wherein the at least one sub-component of the engine includes at least a first sub-component and a second sub-component, and when the at least one sub-component is identified as the source of high pressure leakage, the method further includes the isolating one of the first sub-component and the second sub-component to form an isolated fuel system and determining if the isolated sub-component is the source of high pressure leakage by receiving, by the control computer, data from the at least one sensor representing the pressure within the isolated fuel system over a third period of time during the engine shut down at an isolation initial pressure, determining, by the control computer, a pressure decay value over the third period of time, and comparing the pressure decay value during the third period of time to a third pressure decay predetermined threshold value, wherein if the pressure decay value is below the third pressure decay predetermined threshold value, then repeating the isolating and determining for the other of the first sub-component and the second sub-component, and if the pressure decay value exceeds the third pressure decay predetermined threshold value, then indicating that the isolated one of the first sub-component and the second sub-component is the source of high pressure leakage.

13. The method of claim 12, wherein the isolation initial pressure is one of the first initial pressure and the second initial pressure, and the third pressure decay predetermined threshold value is one of the first pressure decay predetermined threshold value and the second pressure decay predetermined threshold value.

14. The method of claim 1, wherein the first initial pressure is between approximately 1400 and approximately 2500 bar and the second initial pressure is between approximately 500 and approximately 1000 bar.

15. A system for identifying a source of high pressure leakage of a fuel system of an engine, comprising:
   a pressure sensor operable to detect pressure in the fuel system starting at a first initial pressure for a first period of time and starting a second initial pressure for a second period of time, the first initial pressure and the second initial pressure and the first and second periods of time occurring while the engine is shut down; and
   a control module having non-transitory instructions thereon and configured to determine if one of an at least one outlet check valve of the fuel system and an at least one sub-component of the fuel system is a source of high pressure leakage, wherein,
      a) the at least one outlet check value is determined to be a source of high pressure leakage if a pressure decay value determined during the first period of time is below a first pressure decay predetermined threshold value and a pressure decay value determined during the second period of time exceeds a second pressure decay predetermined threshold value; and
      b) the sub-component of the fuel system is determined to be a source of high pressure leakage if the pressure decay values during both the first period of time and the second period of time exceed both the first pressure decay predetermined threshold value and the second pressure decay predetermined threshold value.

16. The system of claim 15, wherein the control module is further configured to transmit an alert to a user of the system indicating the one of the at least one outlet check valve and the at least one sub-component determined to be the source of the high pressure leakage.

17. The method of claim 15, wherein the first and second periods of time are both within approximately 10 minutes of the engine being shut down.

18. The system of claim 15, wherein the first and second periods of time both occur during a first engine shut down.

19. The system of claim 15, wherein the at least on sub-component of the fuel system includes at least a first sub-component and a second sub-component and when the control system identifies the at least one sub-component as the source of high pressure leakage, the pressure sensor is further operable to detect pressure of an isolated fuel system and the control module is further configured to determine which of the first sub-component and the second sub-component is the source of high pressure leakage by isolating at least one of the first sub-component and the second sub-component to form the isolated fuel system.

20. A method for identifying a source of high pressure leakage, comprising:
   providing a control system comprising a control computer having non-transitory instructions thereon, and at least one sensor for determining pressure within a fuel system of an engine;
   shutting the engine down;
   causing pressure within the fuel system to reach a first initial pressure;
   receiving, by the control computer, data from the at least one sensor representing pressure within the fuel system over a first period of time;
   causing pressure within the fuel system to reach a second initial pressure;
   receiving, by the control computer, data from the at least one sensor representing pressure within the fuel system over a second period of time, the first and second periods of time occurring while the engine is shut down;
   determining, by the control computer, a pressure decay value over the first period of time and a pressure decay value over the second period of time;
   determining, by the control computer, a pressure decay ratio of the pressure decay value over the second period of time to the pressure decay value over the first period of time; and
   determining, by the control computer, if one of at least one outlet check valve of the fuel system and at least one sub-component of the fuel system are a source of high pressure leakage in the engine, wherein
      a) the at least one outlet check valve is determined to be a source of high pressure leakage when the pressure decay ratio is approximately 1.5 or higher; and
      b) the at least one sub-component of the fuel system is determined to be a source of high pressure leakage when the pressure decay ratio is approximately 0.75 or lower.

21. The method of claim 20 further comprising transmitting an indication identifying the one of the at least one outlet check valve of the fuel system and the at least one sub-component of the fuel system as the source of high pressure leakage in the engine.

* * * * *